(12) United States Patent
Elegoet

(10) Patent No.: US 8,789,355 B2
(45) Date of Patent: Jul. 29, 2014

(54) SUPPORT STRUCTURE AND MOUNTING COMPONET FOR A THRUST INVERTER

(75) Inventor: Jean-Yves Elegoet, Bennetot (FR)

(73) Assignee: Aircelle, Gonfreville l'Orcher (FR)

( * ) Notice: Subject to any disclaimer, the term of this patent is extended or adjusted under 35 U.S.C. 154(b) by 290 days.

(21) Appl. No.: 12/672,181

(22) PCT Filed: Aug. 6, 2008

(86) PCT No.: PCT/FR2008/001175
§ 371 (c)(1),
(2), (4) Date: Feb. 4, 2010

(87) PCT Pub. No.: WO2009/053560
PCT Pub. Date: Apr. 30, 2009

(65) Prior Publication Data
US 2011/0233305 A1     Sep. 29, 2011

(30) Foreign Application Priority Data

Aug. 20, 2007  (FR) ...................................... 07 05894

(51) Int. Cl.
*F02K 3/02* (2006.01)
*F02K 1/54* (2006.01)
*B05B 12/00* (2006.01)
*F02K 1/72* (2006.01)
*F01D 25/28* (2006.01)

(52) U.S. Cl.
CPC . *F02K 1/72* (2013.01); *F01D 25/28* (2013.01); *Y02T 50/671* (2013.01); *F05D 2260/30* (2013.01)
USPC .................. 60/226.2; 244/110 B; 239/265.25

(58) Field of Classification Search
USPC .......... 244/110 B; 60/226.2, 226.1, 228, 230, 60/796, 798, 799; 239/265.19, 265, 25, 239/265.29, 265.27, 265.37
See application file for complete search history.

(56) References Cited

U.S. PATENT DOCUMENTS

| | | | | |
|---|---|---|---|---|
| 4,185,798 A | * | 1/1980 | Dickenson | 244/110 B |
| 4,212,442 A | * | 7/1980 | Fage | 244/110 B |
| 4,422,605 A | * | 12/1983 | Fage | 244/110 B |
| 2004/0159741 A1 | * | 8/2004 | Sternberger et al. | 244/110 B |
| 2008/0315033 A1 | * | 12/2008 | Diochon et al. | 244/54 |

FOREIGN PATENT DOCUMENTS

| | | |
|---|---|---|
| EP | 1457659 A2 | 9/2004 |
| EP | 1541468 A1 | 6/2006 |
| FR | 2382593 | 9/1978 |
| FR | 2891526 A1 | 4/2007 |
| GB | 2384827 | 8/2003 |

OTHER PUBLICATIONS

International Search Report PCT/FR2008/001175; Dated Aug. 4, 2009.

* cited by examiner

*Primary Examiner* — Gerald L Sung
(74) *Attorney, Agent, or Firm* — Brinks Gilson & Lione

(57) ABSTRACT

Disclosed is a structure for a grid-type thrust reverser, the reverser including an upper beam, a lower beam, and two half-frames fastened to the upper beam and the lower beam, and hollow structures defined by the two half-frames, the hollow structures each having upper ends and lower ends, wherein at least one of the upper and lower beams includes integral parts delimited by walls, the walls forming casings fitted into and blocking corresponding ends of the half-frames.

5 Claims, 1 Drawing Sheet

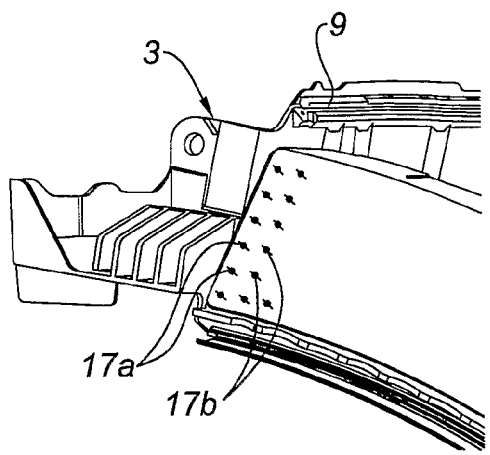
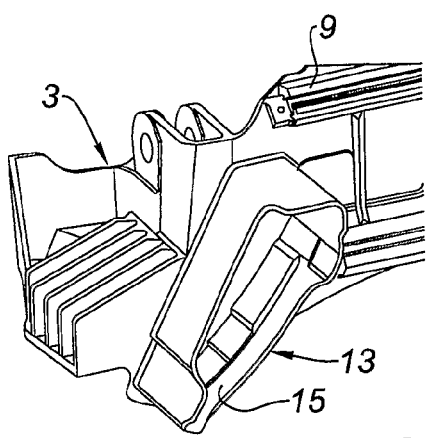
Fig. 2
Fig. 3
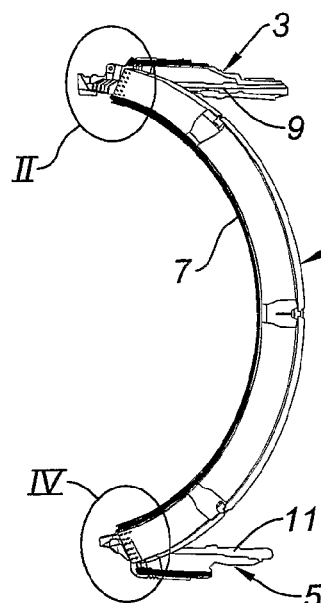
Fig. 1
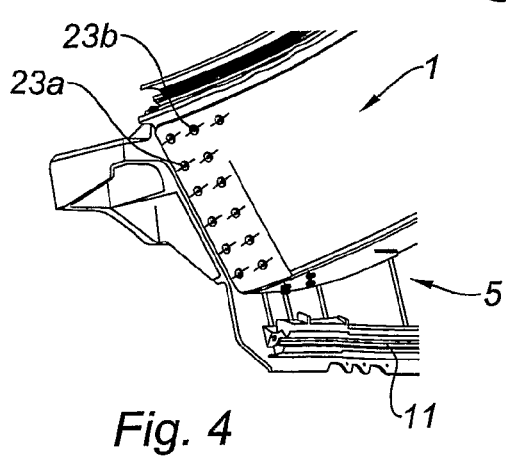
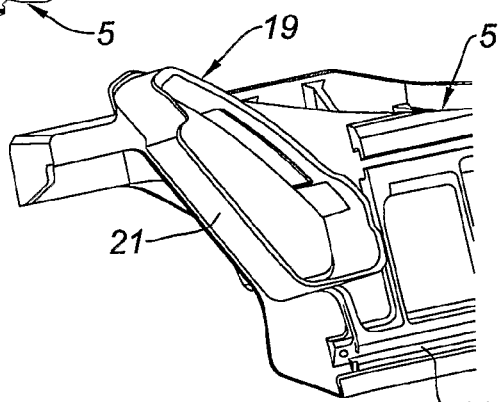
Fig. 4
Fig. 5

SUPPORT STRUCTURE AND MOUNTING COMPONET FOR A THRUST INVERTER

TECHNICAL FIELD

The present invention relates to a structure for a thrust reverser.

BACKGROUND

As is known per se, a thrust reverser, particularly of the grid type, comprises, in particular, a circular element making it possible to fasten this reverser to the blower housing.

This circular element is usually called a front frame and is composed, in fact, of two front half-frames, the ends of each of these half-frames being connected respectively to an upper beam and to a lower beam.

These beams, which form part of the structural elements of the thrust reverser, have the function, in particular, of receiving rails making it possible to effect the sliding of the thrust reverser between its "direct jet" and "reversed jet" positions.

In the prior art, each front half-frame is connected to its upper and lower beams by means of spacers attached by fastening, on the one hand, to the relevant end of the front frame and, on the other hand, to the relevant beam.

The operations of mounting/demounting these spacers on the front half-frame and on the relevant beam involve a large amount of time.

Moreover, the large number of fastening members (screws, rivets) employed represents a considerable mass, this obviously being undesirable in the aeronautical sector where it is known that each gram represents a penalty of about 1 US dollar on the price of the equipment in question.

BRIEF SUMMARY

The disclosure provides a structure for a thrust reverser, which structure does not have the abovementioned disadvantages.

In one exemplary embodiment, the disclosure provides:
a beam for a thrust reverser structure, which beam comprises an integral part forming a casing, capable of fitting into and of being fastened to a front half-frame of said thrust reverser,
a front half-frame for a thrust reverser structure, which front half-frame is shaped, at least one of its two ends, so as to be capable of being fitted onto and of being fastened to a casing of a beam according to the foregoing, and
a half-structure for a thrust reverser, which half-structure is notable in that it comprises upper and lower beams and a front half-frame according to the foregoing.

By virtue of the presence of a connecting casing integrated into each beam, it is no longer necessary to provide a spacer for connecting these members to one another.

It is thus possible to reduce appreciably the number of component parts of the thrust reverser structure, thus making it possible not only to reduce the mounting/demounting times, but also to lower the manufacturing cost.

Moreover, integrating the casings into the beams makes it possible to dispense with any fastening element between these members and therefore to reduce the mass of the assembly appreciably.

It should be noted, in this respect, that, in the prior art, these fastening elements (screws or rivets) operate under traction, this being a disadvantage and therefore requiring an overdimensioning of these members, ultimately leading to an increase in weight.

According to other optional characteristics:
regarding said beam, said part forming a casing comprises on its walls two rows of orifices capable of receiving members for fastening these walls to said front half-frame;
said front half-frame comprises at said end two rows of orifices capable of receiving members for fastening this end to the walls of the casing of a beam according to the foregoing.

The presence of these two rows of orifices makes it possible to employ two rows of fastening members, this being particularly beneficial to distribution of the transmission of forces between each front half-frame and the associated casings.

The present invention also relates to a grid-type thrust reverser, notable in that it comprises two half-structures according to the foregoing, and to a turbojet engine nacelle, notable in that it comprises a thrust reverser according to the foregoing.

BRIEF DESCRIPTION OF THE DRAWINGS

Other characteristics and advantages of the present invention will become apparent from the following description and from an examination of the accompanying figures in which:

FIG. 1 illustrates a half-structure for a thrust reverser according to the invention, FIG. 2 illustrates in the form of a detail a view of the zone II of FIG. 1, FIG. 3 illustrates a view of the upper beam of FIG. 2, this upper beam having been separated from the front half-frame, FIG. 4 illustrates in the form of a detail a view of the zone IV of FIG. 1, and FIG. 5 illustrates a view of the lower beam of FIG. 4, this lower beam having been separated from the front half-frame.

DETAILED DESCRIPTION

Referring now to FIG. 1, this illustrates a front half-frame 1 fastened to an upper beam 3 and a lower beam 5.

The terms "upper" and "lower" are understood in relation to the final positioning of the beams 3 and 5 in a thrust reverser.

The beams 3 and 5 are often denoted respectively by the terms "12 o'clock" and "6 o'clock" by analogy with the positioning of the hands on a clock dial.

The assembly formed by the front half-frame 1 and the two beams 3 and 5 constitutes the half-structure of a thrust reverser, which means that, in reality, a symmetrical half-structure completes that illustrated in FIG. 1, so as to form substantially a closed circle.

The two front frames of these two half-structures are intended, in particular, to make it possible to fasten the thrust reverser to the blower housing of the turbojet engine of an aircraft (not illustrated).

In particular, as is known per se, the inner edge 7 of the front half-frame 1 is intended to be inserted into a V-shaped groove (often designated as a "V-groove") located on the edge of the blower housing.

As regards the beams 3 and 5, these comprise rails 9 and 11, respectively, allowing a thrust reverser cowl to slide between a cruising position, called the "direct jet" position, and a thrust reversal position, called the "reversed jet" position.

In practice, the circulation of the air allowing the thrust reversal takes place through grids, not illustrated, which, in particular, are fastened to the front half-frame 1 and extend on the periphery of this half-frame between the two beams 3 and 5.

Referring more particularly to FIGS. 2 and 3, it can be seen that the upper beam 3 comprises a part 13 delimited by a wall 15 defining a casing shape.

This casing shape is adapted to fit complementarily into the upper end of the front half-frame 1, it being noted that this front half-frame 1 defines a substantially hollow structure.

In other words, when the casing 13 is fitted into the front half-frame 1, it as it were blocks up the upper end of this front half-frame.

As can be seen in FIG. 2, both the wall 15 and the upper end of the front half-frame 1 comprise two rows of orifices making it possible to receive two rows 17a and 17b of fastening members, such as screws or rivets.

The wall 15 defining the casing 13 is formed in one piece with the rest of the beam 3.

In other words, the casing 13 and the beam 3 form one and the same piece.

Similarly, the lower part of the front half-frame 1 cooperates with the lower beam 5 by means of a casing 19 defined by a wall 21 formed in one piece with the lower beam 5.

As can be seen in FIG. 4, two rows of fastening members 23a, 23b are likewise provided there, making it possible to fix the lower end of the front half-frame 1 to the casing 19.

As can be appreciated in light of the foregoing description, integrating the casings 13, 19 into the respective beams 3, 11 makes it possible to reduce the number of component parts of the thrust reverser structure.

Contrary to the prior art, it is no longer necessary to provide means for fastening the casings to their associated beams.

A substantial weight saving is thus obtained, the more so because, since the fastening members of the prior art operate under traction, provision has to be made to oversize them and therefore to increase their weight.

It will be noted that the presence of two rows of fastening members 17a, 17b and 23a, 23b makes it possible to have an optimal transmission of forces between the beams 3, 5 and the front half-frame 1.

The present invention, of course, is in no way limited to the embodiment described and illustrated, which is provided simply as an example.

The invention claimed is:

1. A structure for a grid-type thrust reverser, the reverser comprising:
   an upper beam, a lower beam, and two half-frames fastened to said upper beam and said lower beam; and
   hollow structures defined by said two half-frames, said hollow structures each having upper ends and lower ends,
   wherein at least one of said upper and lower beams includes integral parts delimited by walls, said walls forming casings fitted into and blocking corresponding ends of said half-frames,
   wherein said casings are integrated into the beams to form one piece.

2. The structure of claim 1, wherein each of said upper beam and said lower beam includes said casings fitted into and blocking corresponding ends of said half-frames.

3. The structure of claim 1, wherein said walls of each of said casings includes two rows of orifices capable of receiving members for fastening said walls to said half-frames.

4. A turbojet engine nacelle, comprising a grid-type thrust reverser as claimed in claim 1.

5. The structure of claim 1, wherein said casings include volumes defined by closed walls.

* * * * *